(12) United States Patent
Kano et al.

(10) Patent No.: US 11,436,593 B2
(45) Date of Patent: Sep. 6, 2022

(54) TRANSACTION PROCESSING DEVICE, TRANSACTION PROCESSING METHOD, AND PROGRAM FOR SAME

(71) Applicant: bitFlyer, INC., Minato-ku (JP)

(72) Inventors: Yuzo Kano, Minato-ku (JP); Takafumi Komiyama, Minato-ku (JP)

(73) Assignee: BITFLYER BLOCKCHAIN, INC., Tokyo (JP)

( * ) Notice: Subject to any disclaimer, the term of this patent is extended or adjusted under 35 U.S.C. 154(b) by 390 days.

(21) Appl. No.: 16/089,500

(22) PCT Filed: Mar. 30, 2017

(86) PCT No.: PCT/JP2017/013365
§ 371 (c)(1),
(2) Date: Sep. 28, 2018

(87) PCT Pub. No.: WO2017/170912
PCT Pub. Date: Oct. 5, 2017

(65) Prior Publication Data
US 2019/0108513 A1 Apr. 11, 2019

(30) Foreign Application Priority Data
Mar. 31, 2016 (JP) .............................. JP2016-071342

(51) Int. Cl.
*G06Q 20/36* (2012.01)
*H04L 9/08* (2006.01)
(Continued)

(52) U.S. Cl.
CPC ......... *G06Q 20/3674* (2013.01); *G06F 21/64* (2013.01); *G06Q 20/3825* (2013.01);
(Continued)

(58) Field of Classification Search
CPC .... G06Q 20/3674; G06Q 20/38; G06Q 20/40; G06Q 20/3825; G06Q 20/405;
(Continued)

(56) References Cited

U.S. PATENT DOCUMENTS 5,005,200 A * 4/1991 Fischer ................... G06F 21/00
380/30
9,298,806 B1 * 3/2016 Vessenes ............... G06Q 20/065
(Continued)

FOREIGN PATENT DOCUMENTS

| JP | 2000-41035 | 2/2000 |
| JP | 2005-524149 | 8/2005 |

(Continued)

OTHER PUBLICATIONS

Y. Fuchita, "Feature: Innovation in finance, innovation of blockchain and financial transaction", Nomura Capital Markets Quarterly, Nov. 1, 2015, vol. 19, No. 2, pp. 11-35.
(Continued)

*Primary Examiner* — Patrick McAtee
*Assistant Examiner* — Vincent I Idiake
(74) *Attorney, Agent, or Firm* — Cozen O'Connor

(57) ABSTRACT

A method of recordation request of a compound transaction to a blockchain distributed network, comprising steps of: the first node constituting the distribution network signing a compound transaction in which a plurality of sources of assets exist by a secret key of the node, when there is a remaining source by which the compound transaction needs to be signed, the first node transmitting the compound transaction to a second node constituting the distributed network, and when there is no remaining source by which the compound transaction needs to be signed, the first node
(Continued)

transmitting the compound transaction to a third node constituting the distributed network to request recordation to the distributed network.

14 Claims, 6 Drawing Sheets

(51) Int. Cl.
*G06Q 20/40* (2012.01)
*G06F 21/64* (2013.01)
*G06Q 20/38* (2012.01)
*H04L 9/06* (2006.01)
*H04L 9/32* (2006.01)
*G09C 1/00* (2006.01)

(52) U.S. Cl.
CPC ........... *G06Q 20/40* (2013.01); *G06Q 20/405* (2013.01); *G09C 1/00* (2013.01); *H04L 9/0637* (2013.01); *H04L 9/08* (2013.01); *H04L 9/32* (2013.01); *H04L 9/3265* (2013.01)

(58) Field of Classification Search
CPC . H04L 9/08; H04L 9/32; H04L 9/0637; H04L 9/3265; G09C 1/00; G06F 21/64
See application file for complete search history.

(56) References Cited

U.S. PATENT DOCUMENTS

| | | | |
|---|---|---|---|
| 2009/0254440 A1* | 10/2009 | Pharris | G06Q 20/105 705/17 |
| 2015/0244690 A1 | 8/2015 | Mossbarger | |
| 2015/0332283 A1 | 11/2015 | Witchey | |
| 2016/0342989 A1* | 11/2016 | Davis | G06Q 20/3674 |
| 2017/0230353 A1* | 8/2017 | Kurian | G06Q 20/4014 |

FOREIGN PATENT DOCUMENTS

| | | |
|---|---|---|
| JP | 2008-131632 | 6/2008 |
| JP | 2009-500951 | 1/2009 |
| JP | 2015-186101 | 10/2015 |
| JP | 58-58506 B1 | 2/2016 |
| WO | WO 2007/005750 | 1/2007 |
| WO | WO 2009/066443 | 5/2009 |

OTHER PUBLICATIONS

E. Omata et al., "Home Network to Renkei shita P2P Streaming", NTT DoCoMo Technical Journal, Oct. 1, 2005, vol. 13, No. 3, pp. 60-63.
International Search Report dated Jun. 13, 2017 issued in corresponding PCT/JP2017/013365.
Written Opinion of the International Searching Authority dated Jun. 13, 2017 issued in corresponding PCT/JP2017/013365.
Office Action dated Sep. 20, 2019 issued in European Patent Application No. 17775446.2.
Antonopoulos "Mastering Bitcoin—Unlocking Digital Crypto-Currencies, Chapter 5: Transactions", Dec. 1, 2014, pp. 111-138.
Xiwei Xu, et al., "The Blockchain as a Software Connector and 2016 13th Working IEEE/IFIP Conference on Software Architecture", U.S., IEEE, Apr. 2016, and pp. 182-191.
Morioka, "The Future Image Of The Pay By Card Which Looks At The Key To, Special Report 1 Settlement-Of-Accounts Expansion In The "Fusion With Service" Automobile Field," Feb. 25, 2016, vol. 29, No. 1, pp. 32-35.
Office Action dated May 22, 2018 issued in Japanese Patent Application No. 2018-509457.
Antonopoulos, "Transactions," Mastering Bitcoin—Unlocking Digital Crypto-Currencies, Dec. 1, 2014, pp. 109-136.
Narayanan et al., "Bitcoin and Cryptocurrency Technologies," Feb. 9, 2016, pp. 1-308.
Office Action dated Apr. 21, 2021 issued in Japanese Patent Application No. 2018-153327.
Office Action dated Apr. 22, 2021 issued in European Patent Application No. 17775446.2.
Office Action dated Mar. 25, 2021 issued in Chinese Patent Application No. 201780033777.X.

\* cited by examiner

FIG. 3
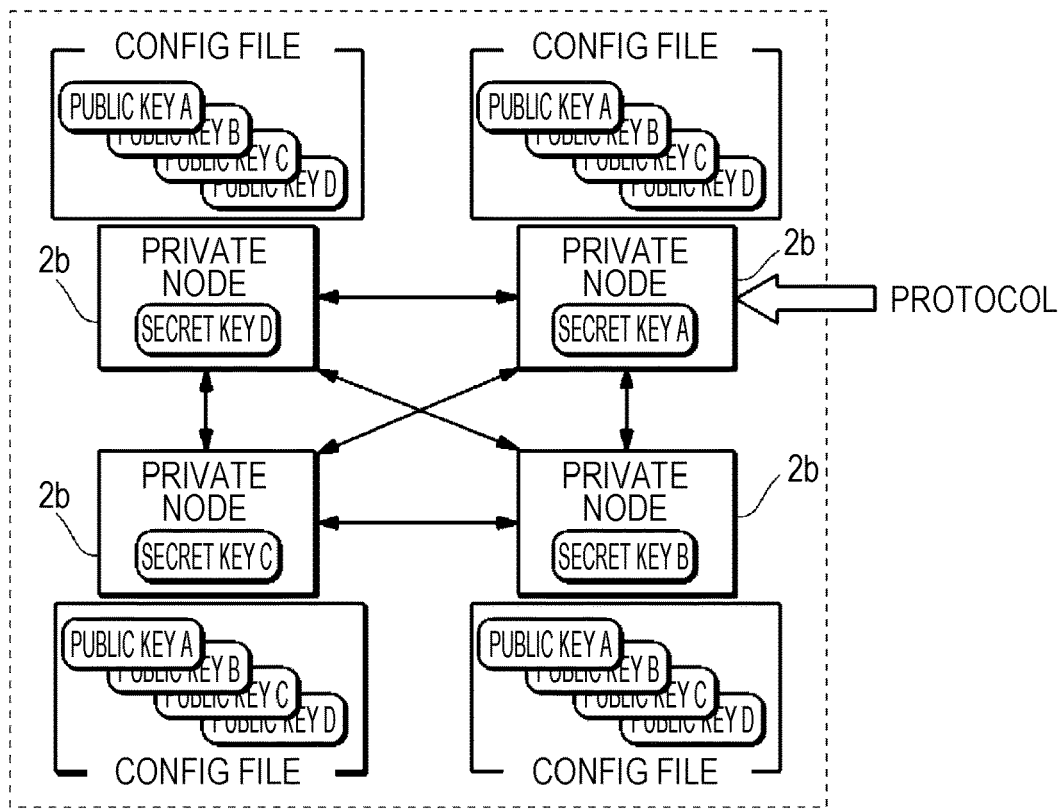
FIG. 4
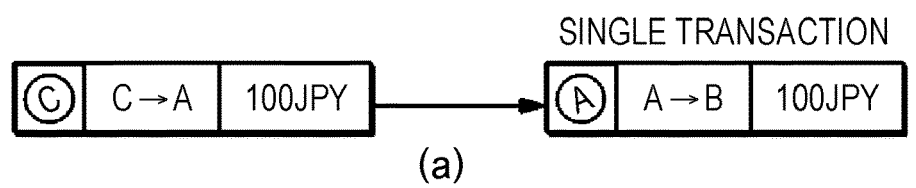
(a)
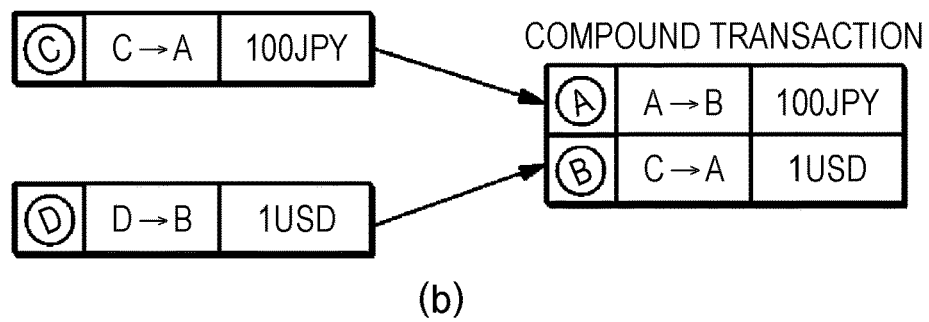
(b)

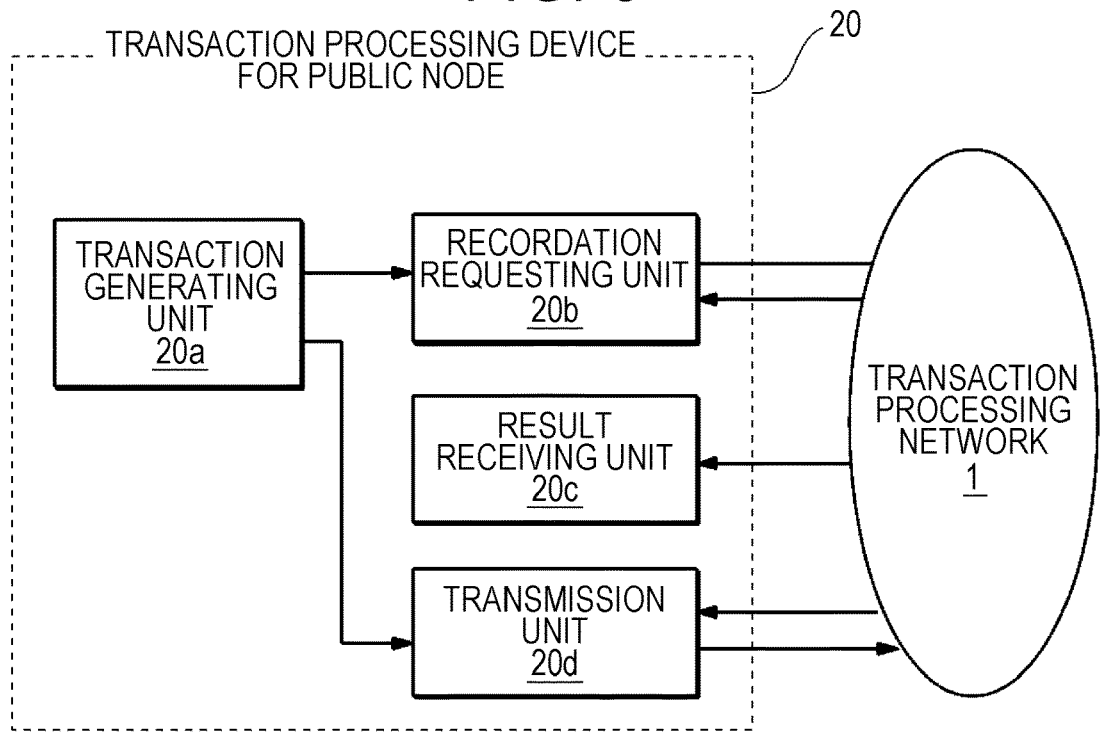

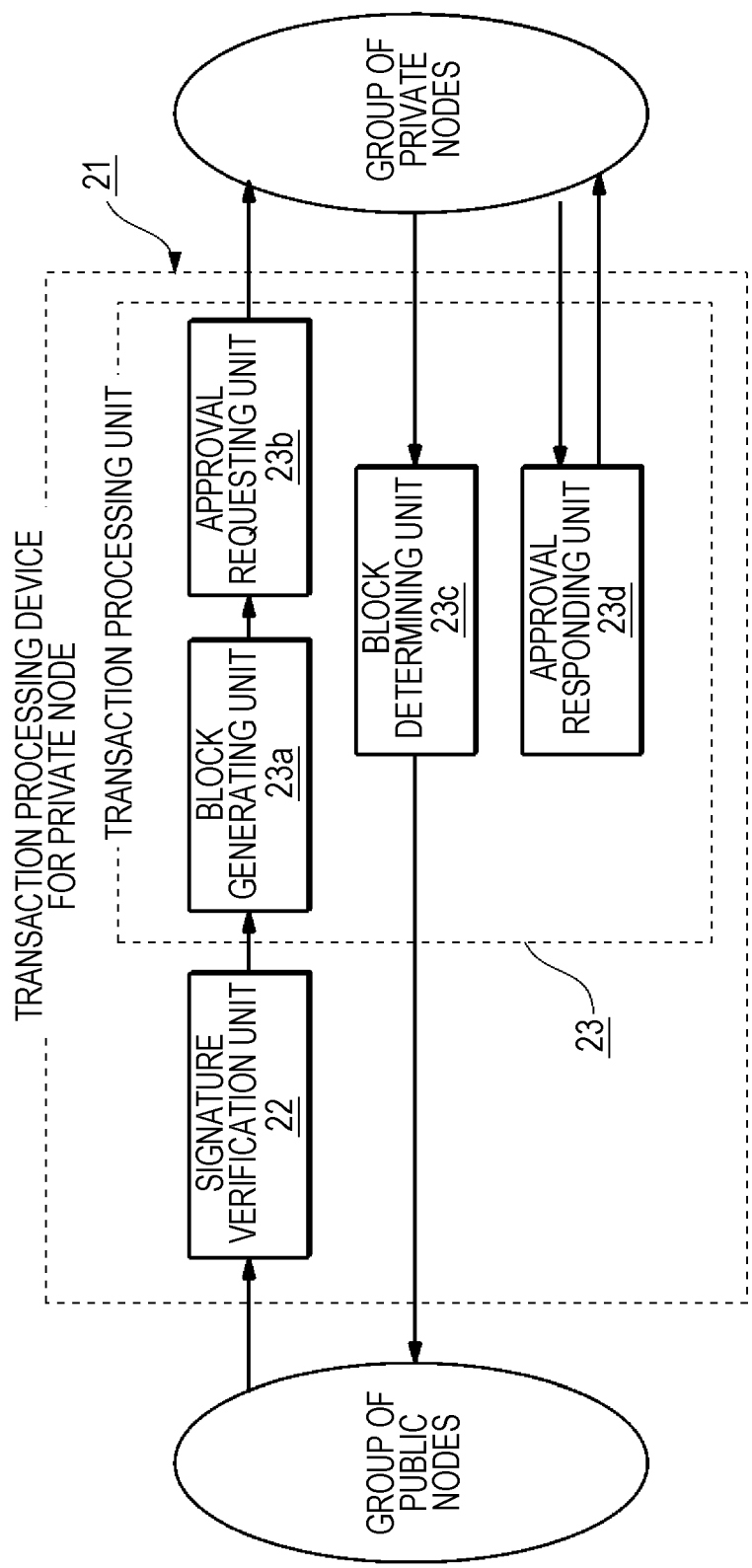

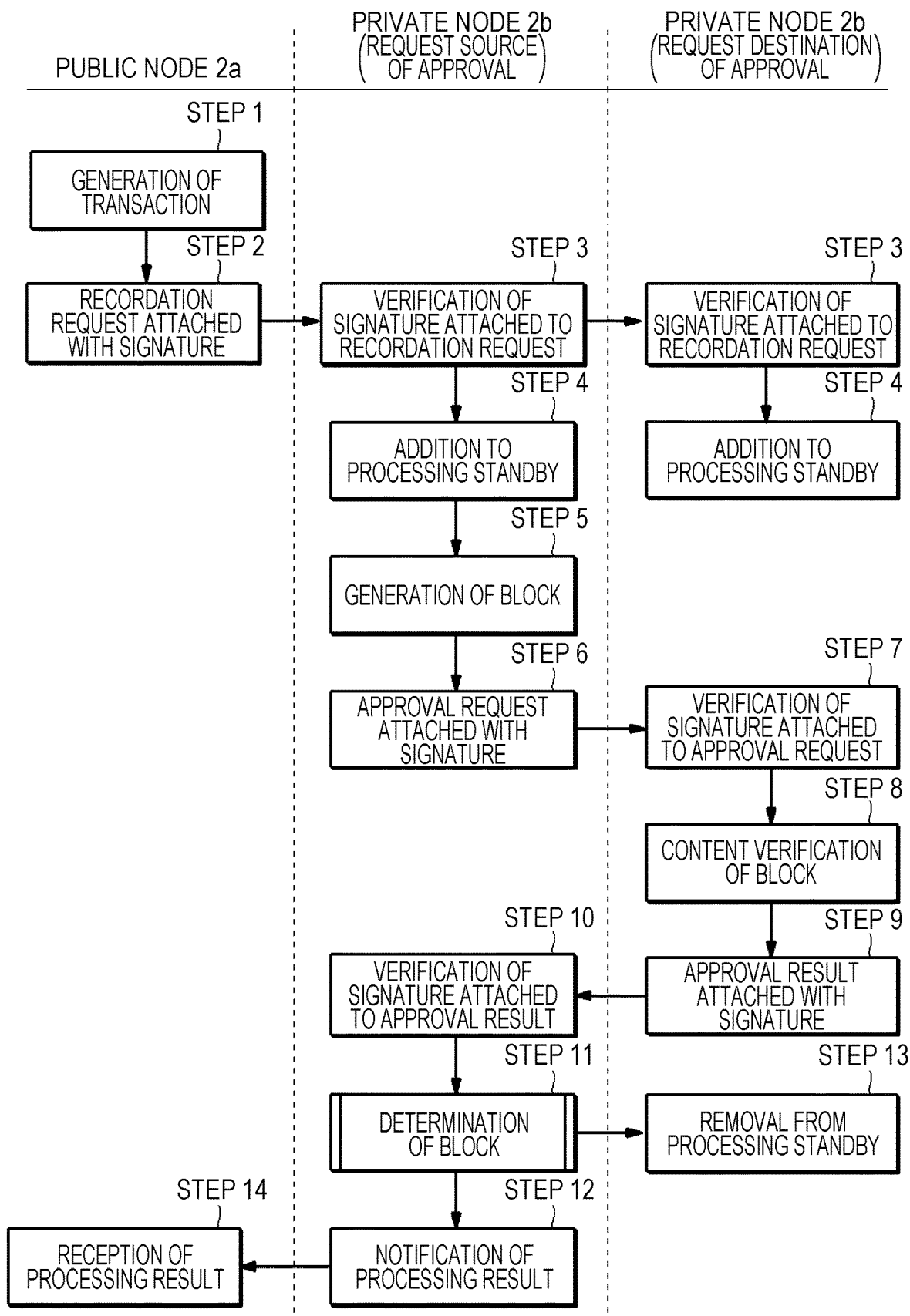

FIG. 9
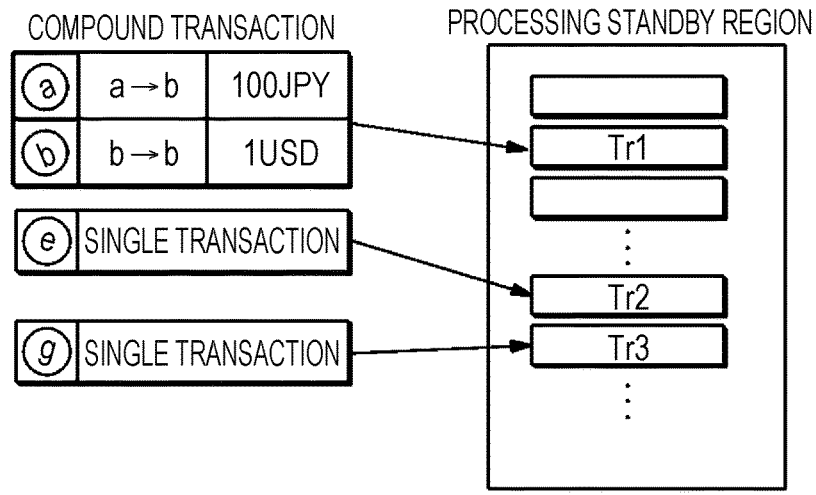
FIG. 10
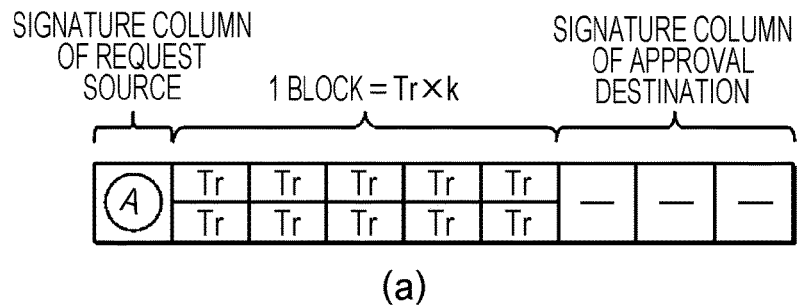
(a)
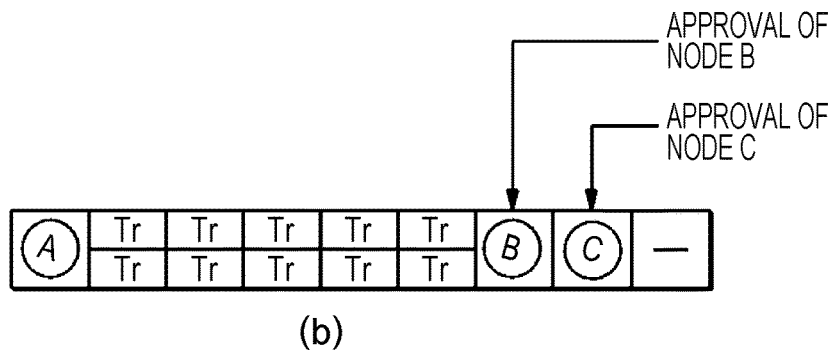
(b)
FIG. 11
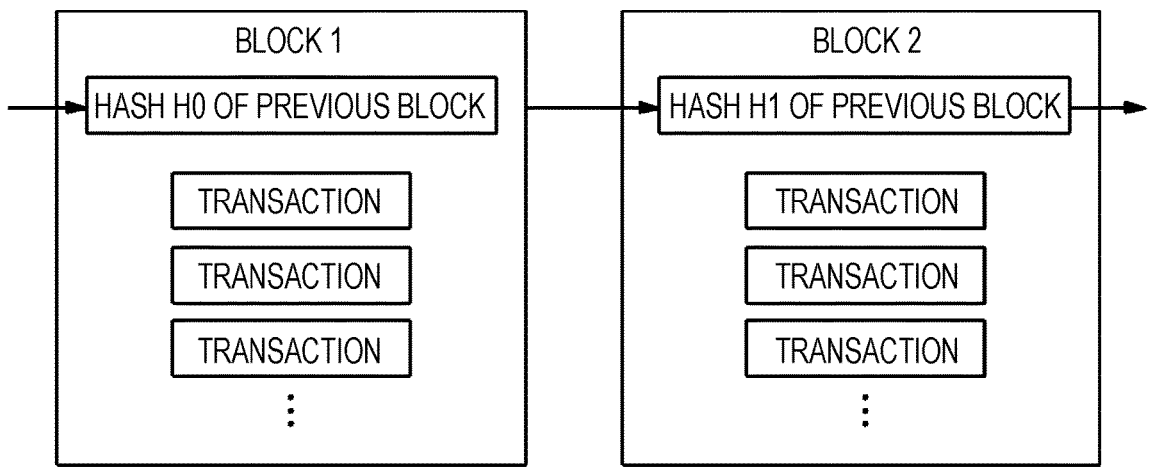

TRANSACTION PROCESSING DEVICE, TRANSACTION PROCESSING METHOD, AND PROGRAM FOR SAME

RELATED APPLICATIONS

This is a U.S. National Phase Application under 35 USC 371 of International Application PCT/JP2017/013365 filed on Mar. 30, 2017.

This application claims the priority of Japanese application no. 2016-071342 filed May 31, 2016, the entire content of which is hereby incorporated by reference.

FIELD OF THE INVENTION

The present invention relates to a transaction processing device and a computer program for processing a transaction, and particularly to an expansion of transaction forms which can be handled in one transaction.

BACKGROUND OF THE INVENTION

Conventionally, there is known a technique called a blockchain. The technique is a mechanism which makes the same record synchronized among a number of nodes on a network. In a case where a new record is added to the existing records, a block, unit of recording, takes over the content (hash) of the previous block and is added sequentially in a chain shape as is its name. In general, the term "blockchain" indicates the structure of a database in which blocks are linked in a chain shape, but it may also be used in a broader sense such as a mechanism operating as a P2P network or a mechanism of approving transactions. At this moment, the definition is not set. In order to prevent confusion between two meanings, in this specification, the term will be called "blockchain" in a case where the former meaning of the narrow sense is used, or will be called "blockchain technology" in a case where the latter meaning of the broader sense is used.

Since the blockchain technology has many advantages such as zero downtime, difficulty of falsification, and low cost, not only virtual currencies including Bitcoin and its derivatives but also a method of managing information relating to various assets as transactions is beginning to attract attention. For example, Non Patent Literature 1 discloses the use of a blockchain that can take an important role in establishing reliability for the purpose of proving the existence and identity of various documents.

Non Patent Literature 1: Blockchain establishes a reliable relation in a cyber space—Important meaning of "Existence Proof" and "Identity Proof", [online], [Retrieved on Mar. 28, 2016], Internet <URL:http://diamond.jp/articles/-/53050>

In the blockchain technology of the related art, a transaction form handled in one transaction is limited to single asset movement, for example, "100 yen is transferred from A to B". Therefore, for example, an exchange such as "1 dollar is transferred from B to A instead of transferring 100 yen from A to B," that is, a compositive transaction form in which a plurality of asset movements occur, is not possible to be handled in one transaction.

SUMMARY OF THE INVENTION

One object of the present invention is to enable handling a compositive transaction form in one transaction while securing the reliability of transaction contents described in the transaction.

This and other objects are attained in accordance with one aspect of the invention directed to a transaction processing device which records a transaction noted with transaction information to a database on the basis of a request from a node on a network. The transaction processing device includes a signature verification unit and a transaction processing unit. In a case where a transaction is noted with the compositive transaction in which there are a plurality of sources of assets, the signature verification unit verifies a validity of a plurality of signatures which are attached to the transaction and created by a private key of an address managed by each of a plurality of sources using public keys corresponding to respective private keys. The transaction processing unit records the transaction to the database on condition that all of the plurality of signatures are valid.

Here, in the first aspect, the transaction processing unit may include a block generating unit, an approval requesting unit, and a block finalization unit. The block generating unit generates a block which includes the transaction. The approval requesting unit attaches the signature created by the private key of the own node to the block, and transmits an approval request of the block to m (m≥2) nodes. In a case where an approval result is received from the node which is a request destination of the approval, the block finalization unit verifies a validity of the signature attached to the approval result using the public key of the request destination of the approval, and finalizes that the block is added to the database which records transactions in unit of blocks on the condition that n (m≥n≥1) or more nodes in the m nodes approve.

According to a second aspect, there is provided a transaction processing device which generates a transaction noted with transaction information, and requests the node on the network to record the transaction. The transaction processing device includes a transmission unit and a recordation requesting unit. In a case where the address managed by the own node corresponds to any source address by which a signature needs to be attached, and there is left a source address by which a signature needs to be attached other than the address managed by the own node, the transmission unit attaches the signature created by the private key of the address managed by the own node to a transaction noted with the compositive transaction in which there are a plurality of sources of assets, and transmits the transaction to another node. In a case where the address managed by the own node corresponds to any source address by which a signature needs to be attached, and there is left no source address by which a signature needs to be attached other than the address managed by the own node, the recordation requesting unit attaches the signature created by the private key of the address managed by the own node to the transaction, transmits the transaction attached with signatures of the all sources, and requests the node having a recording authority to the database to record the transaction to the database.

According to a third aspect, there is provided a computer program for processing a transaction in which a transaction noted with transaction information is recorded in the database on the basis of a request from the node on the network. The computer program causes a computer to perform a process, with respect to a transaction noted with a compound transaction in which there are a plurality of sources of assets, which includes a first step of verifying a validity of a plurality of signatures which are attached to the transaction and created by a private key of an address managed by each of a plurality of sources using public keys corresponding to respective private keys, and a second step of recording the transaction to the database on the condition that all of the plurality of signatures are valid.

Here, in the third aspect, the second step may include a step of generating a block which includes a transaction, a step of transmitting an approval request of the block to m (m≥2) nodes after attaching a signature created by the private key of the own node to the block, and a step, in a case where an approval result of the block is received from the node which is a request destination of the approval, of verifying a validity of the signature attached to the approval result using the public key of the request destination of the approval, and finalizing that the block is added to the database which records transactions in unit of blocks on condition that n (m≥n≥1) or more nodes in the m nodes approve.

According to a fourth aspect, there is provided a computer program for processing a transaction which generates a transaction noted with transaction information and requests a recording of the transaction to a node on a network. The computer program causes a computer to perform a process, with respect to a transaction noted with a compound transaction in which there are a plurality of sources of assets, which includes a first step, in a case where the address managed by the own node corresponds to any source address by which a signature needs to be attached, and there is left a source address by which a signature needs to be attached other than the address managed by the own node, of attaching the signature created by the private key of the address managed by the own node to the transaction, and transmitting the transaction to another node, and a second step, in a case where the address managed by the own node corresponds to any source address by which a signature needs to be attached, and there is left no source address by which a signature needs to be attached other than the address managed by the own node, of attaching the signature created by the private key of the address managed by the own node to the transaction, transmitting the transaction attached with signatures of the all sources, and requesting the node having a recording authority to the database to record the transaction to the database.

In the first to fourth aspects, the database is preferably a distributed database in which the nodes on the network store the same recordation contents in synchronization with each other, and the blocks which are a recording unit are linked according to the recordation order. In addition, the network preferably includes a plurality of public nodes which generate a transaction noted with transaction information and a plurality of private nodes which are restricted in the number of nodes having the recording authority to the database. The sources of assets are preferably addresses which are managed by public nodes.

Advantageous Effects of Invention

According to an embodiment of the invention, transaction information relating to a compound transaction is allowed to be noted in one transaction. Then, in a case where the transaction relating to the compound transaction is recorded in a database, one of the recordation conditions is that all the signatures of sources of assets are valid in order to prevent forgery (including a concerned party of a transaction entity). With this configuration, the respective transactions of the compound transaction are verified to be recorded in the database simultaneously and integrally. It is possible to prevent a situation where one is recorded and another is not yet recorded from temporally occurring. As a result, various transaction forms can be handled by a single transaction while securing a reliability of the transaction contents noted in the transaction.

BRIEF DESCRIPTION OF DRAWINGS

FIG. 3 is an explanatory diagram of a setting method of a public key in a private node.

FIG. 4 is an explanatory diagram of a single transaction and a compound transaction.

FIG. 5 is a functional block diagram illustrating a transaction processing device for a public node.

FIG. 6 is an explanatory diagram of a signature flow of the compound transaction.

FIG. 7 is a functional block diagram illustrating the transaction processing device for a private node.

FIG. 8 is a diagram illustrating a flow of a recording process of a transaction.

FIG. 9 is a diagram illustrating a state of processing standby of a transaction.

FIG. 10 is an explanatory diagram of approval of a block by a multisignature.

FIG. 11 is an explanatory diagram of a database structure.

DETAILED DESCRIPTION OF THE DRAWINGS

Figure 1:
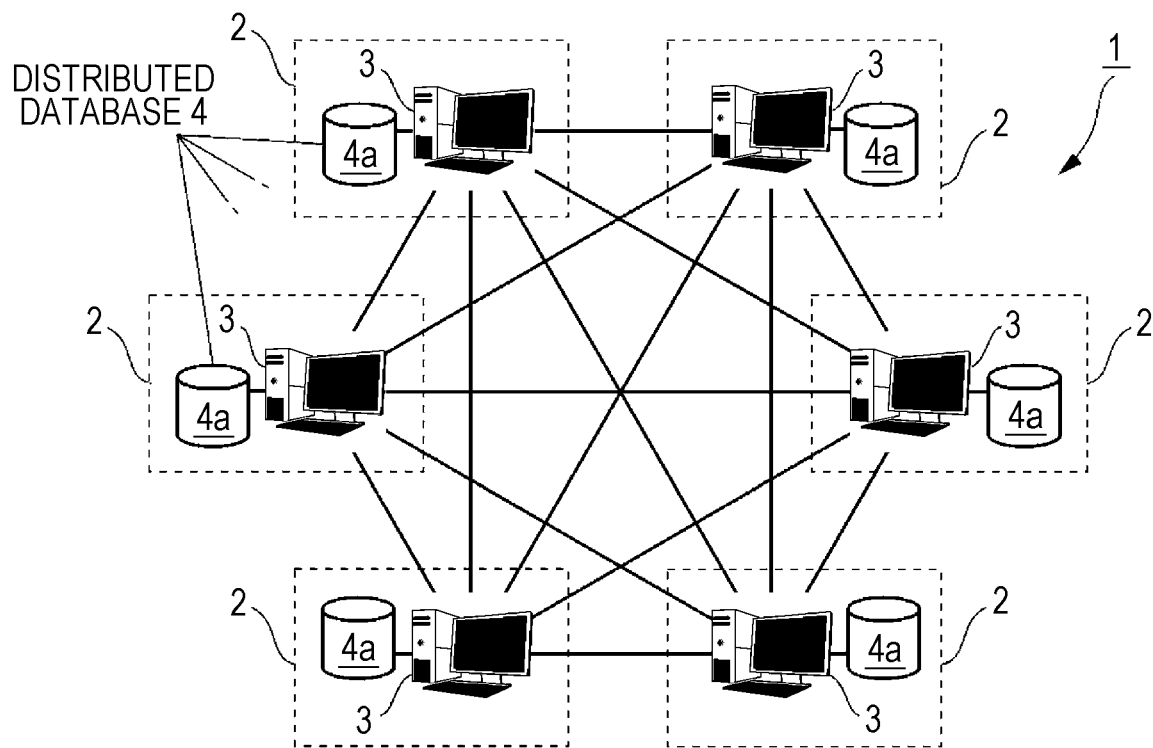
FIG. 1 is a diagram illustrating a physical configuration of a transaction processing network.

FIG. 1 is a diagram illustrating a physical configuration of a transaction processing network according to this embodiment. The transaction processing network 1 is used as a management system which manages information on transactions. A target type of the transaction is determined in advance as a system specification according to the use thereof. For example, in the case of a bank system, a real currency is a transaction target. In the case of a securities system, a securities transaction is a transaction target. In this specification, the "transaction" refers to a concept of not only retaining (stock) assets or the states of the assets such as real currencies, virtual currencies, securities, and real estates, but also transfer (flow) of the assets, and contracts. The contract can be both assets and debts. In addition, the transaction may be defined in a broader range with the introduction of a derivative concept.

For example, "to send one hundred million yen from A to B" or "to receive 500 specific shares from A to B" is identical to the transfer (flow) of the assets, and the transaction can b understood as a one-directional transaction. In the transaction form, the movement source A of the asset is a source of the asset. The movement destination B of the asset is a new source of the asset. The expression "A holds savings of one hundred million yen" or "A holds 500 specific shares" may be considered as an asset itself, or may be considered as a concept of a retaining (stock) of the state of the asset. In the case of the retaining (stock) of the state of the asset, by managing the status that there are a plurality of movement sources (holding sources) of the assets but the assets are not transferred, a compound transaction can be described in a similar manner with the transfer (flow) of the asset. The expression "A purchases US dollars as much as one hundred million yen from B" or "A purchases 500 specific shares for 1,000 yen per share from B" may be considered as a bi-directional transaction in which two transfers (flow) of the assets occur at the same time. In the case of "the compound transaction in which there are a plurality of movement sources of the assets", it means a transaction in which a plurality of movements (flow) of the assets, a plurality of retaining of states (stock) of the assets, or the plurality of transfers (flow) of the assets and the plurality of retaining of states (stock) are coexisting.

The transaction processing network 1 is a P2P (Peer to Peer) network, and includes not only a pure P2P but also a so-called hybrid (a client server is partially included) network. Nodes 2 participating (connected) in the transaction processing network 1 are in communication (P2P communication) in a one-to-one equal relation. Each of the nodes 2 is a node device, and includes a computer 3 and a database 4a. The information on transactions is managed by a distributed database 4 on the network 1, that is, an aggregate of the databases 4a provided on the respective nodes 2. All the databases 4a existing on the network 1 operate in synchronization by a blockchain technology, and basically hold the same recordation contents. In a case where the node 2 having authority updates the distributed database 4, the node 2 notifies the other nodes 2 connected thereto of the updating. Thereafter, the notification is finally transferred over the entire network 1 by the repeating P2P communication between the nodes. With this configuration, all the databases 4a of the nodes 2 are updated, and share the same recordation contents.

The P2P communication in the network 1 is performed by an SSL communication for security. In addition, a validity of the transaction transferred between the nodes 2 is verified by an electronic signature using a public key encryption. As a premise, each of the nodes 2 holds a private key (code number) of an address managed by own node on the condition that all the sources of assets (movement sources) attach the signature by a private key of the address managed by the own node (an owner of the network address=a holder of the private key). The public key is uniquely specified by the private key. The network address may be the public key itself, or may be generated by adding a checksum to the hash of the public key similarly to Bitcoin. A node sending a transaction transmits the transaction after attaching a signature created by the private key of an address managed by the own node to the sending transaction. A node receiving a transaction verifies the validity of the signature attached to the received transaction using the public key corresponding to the private key. Further, the public key encryption used herein is different from the public key encryption of a multisignature relating to block approval described below. The private key of the multisignature is held only by a private node 2b regardless of the network address.

Further, FIG. 1 illustrates a full connection in which each node 2 is connected to all the other nodes 2, which is mere exemplary, and any topology may be employed. In addition, in a case where information is transmitted to a specific node 2, there may be introduced a protocol in which an address is designated to directly communicate with a transmission destination instead of an indirect P2P communication.

Figure 2:
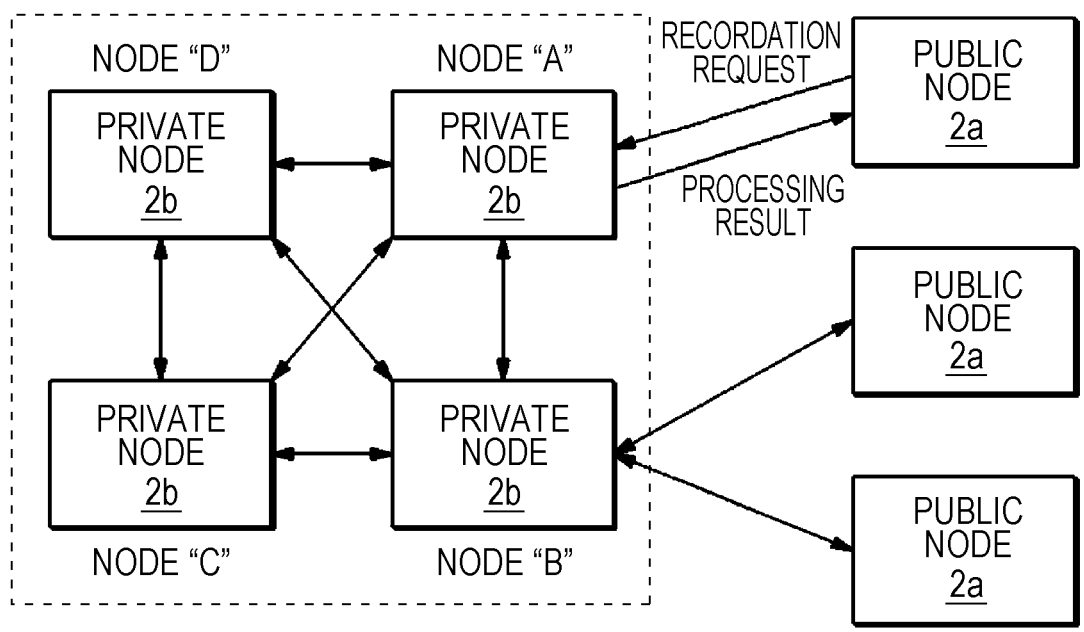
FIG. 2 is a diagram illustrating a logical configuration of the transaction processing network.

FIG. 2 is a diagram illustrating a logical configuration of the transaction processing network 1. In this embodiment, the nodes 2 of the transaction processing network 1 include public nodes 2a and private nodes 2b. The public node 2a is an application node which will be a subject of a transaction (an unreliable node may be included). The public node 2a generates a transaction written with the information on transactions, attaches the signature thereto, and directly or indirectly transmits the transaction to a group of the private nodes 2b. The public node 2a performs only a recordation request of the transaction to the group of private nodes 2b, and a recording process onto the distributed database 4 is not performed on the public node. Important things for the public node 2a are a query (even not a latest one), a signature on a newly created transaction, and a request of a transaction approval to the group of private nodes 2b.

Further, for example, recordation contents of the database 4a may be managed with index on some of the plurality of public nodes 2a in order to achieve a high processing speed when a retrieval is performed such as when a balance of a certain address is calculated. The data of the distributed database 4 is basically a key-value type. Therefore, there is a defect that it takes a lot of time in a conditional inquiry. In order to solve the defect, a node with an original index for retrieval is provided to expand an application range.

The private node 2b is a reliable node in which the number of nodes is restricted, and performs the recording process to the distributed database 4 with respect to the transaction requested from the public node 2a. The recording process is performed by a cooperation among the group of private nodes 2b as described below. In a case where the recording process is completed, notification of a processing result is provided to the public node 2a of the request source. An important thing for the private node 2b is to approve transactions and form a block to add it to the distributed database 4. The mining used in virtual currencies such as Bitcoin and rewards (incentives) such as commission are not necessary.

A plurality of private nodes 2b perform the block approval by the multisignature relating to the block approval using a public key encryption. Therefore, as illustrated in FIG. 3, each private node 2b includes the private key of the own node. Further, a CONFIG file with the public keys written therein is read when the system is activated, and the public keys are shared among the private nodes 2b. In addition, there is prepared a protocol which adds or invalidates a public key of the private node 2b. By executing the protocol, a public key is added or invalidated without rewriting the CONFIG file. Information relating to public keys needs to be strictly managed so that the information is handled for example using SSL to secure safety.

FIG. 4 is an explanatory diagram of a single transaction and a compound transaction. In a transaction handled by the transaction processing network 1, there are the single transaction and the compound transaction. These two types of transactions are both treated as one transaction on the system processing and for all of the sources of assets (including single source) signature by the holder is needed. In the single transaction as illustrated in (a) of the drawing, a movement of one asset is denoted as the case "100 yen is moved from the movement source A (holding source) to the movement destination B (new holding source)". The signature created by the private key of the address managed by the movement source A of the asset is attached. On the other hand, as illustrated in (b) of the drawing, the compound transaction is denoted as a transaction accompanying the movements of two assets such as the case "100 yen is moved from the movement source A (holding source) to the movement destination B (new holding source), and 1 dollar is moved from the movement source B (holding source) to the movement destination A (new holding source)", that is, the exchange of the assets. In this case, since there are two movement sources of the assets, there are needed both of the signature created by the private key of the address managed by the movement source A (holding source) of the one asset and the signature created by the private key of the address managed by the movement source B (holding source) of the other asset.

The number of asset movements which can be denoted in the compound transaction is not limited to "2", and a transaction form accompanying 3 or more asset movements may be described. For example, 100 yen from the movement source A to the movement destination B, 1 dollar from the movement source B to a movement destination C, and one drink from the movement source C to the movement destination A may be moved respectively (exchange between three nodes). Since three asset movements are accompanied in the transaction form, there are required (three) signatures created by the private keys of the addresses managed by three movement sources A to C. In addition, the compound transactions may also be compounded more. In this case, there is an area to write metadata in the transaction in addition to the movements of the assets which can be utilized.

FIG. 5 is a functional block diagram illustrating a transaction processing device for the public node 2a. The transaction processing device 20 includes a transaction generating unit 20a, a recordation requesting unit 20b, a result receiving unit 20c, and a transmission unit 20d. The transaction generating unit 20a generates a transaction (a single transaction or a compound transaction) noted with the information on the transaction according to a predetermined format. The information on transactions is acquired, for example, by information input by a user according to instructions on a display screen, or information received through another network.

In the case of the single transaction, the recordation requesting unit 20b attaches the signature created by the private key of the address managed by the subject node to the transaction generated by the transaction generating unit 20a, transmits the transaction to the group of private nodes 2b through the P2P communication among the nodes 2, and requests the recording of the transaction to the group of private nodes 2b. The result receiving unit 20c receives the processing result of the transaction transmitted from any one of the private nodes 2b, and presents the result to the user.

On the other hand, in the case of the compound transaction, the transaction generated by the transaction generating unit 20a is transmitted to the group of private nodes 2b through a signature flow illustrated in FIG. 6. First, in a certain node 2a, the compound transaction in which the compositive transactions of the sources A and B of assets are compounded is generated by the transaction generating unit 20a ((a) of the drawing). At this stage, the signature column of the movement source A with respect to "the fund movement of 100 yen from the movement source A to the movement destination B" and the signature column of the movement source B with respect to "the fund movement of 1 dollar from the movement source B to the movement destination A" are left blank. However, in a case where the address managed by the own node corresponds to any one of the movement sources A and B, at this stage, the signature created by the private key of the address managed by the own node is attached to the transaction ((b) of the drawing). The generated compound transaction is transmitted to the other public node 2a through the P2P communication.

The format of the compound transaction has a data structure in which a plurality of transactions can be stored, and also a plurality of electronic signatures corresponding to the respective transactions can be stored. The signature created by the source of asset represented by a certain transaction can be made not only with respect to the transaction itself but also with respect to all of the plurality of transactions. With this configuration, it is possible to nullify the compound transaction in a case where some or all of the plurality of transactions are falsified after the signature by some of the holding sources is made.

At the node 2a which receives the compound transaction, the transmission unit 20d writes the signature created by the private key of the address managed by the own node in the corresponding signature column (blank) in a case where the address managed by the own node corresponds to any one of the addresses A and B by which signature needs to be attached. For example, as illustrated in (b) of the drawing, in a case where the address managed by the own node is "A", the signature "A" is written in the signature column of "the fund movement of 100 yen from the movement source A to the movement destination B". Then, the transmission unit 20d transmits the transaction attached with the signature "A" to the other public nodes 2a through the P2P communication in a case where there is left an address by which signature needs to be attached other than the address managed by the own node (in this case, the signature "B" is not written). Further, the transmission may be performed by other transmission/exchange means (for example, data transmission using an external network) without going through a P2P network.

On the other hand, in a case where the address managed by the own node does not correspond to any of the addresses A and B by which signature needs to be attached, the node 2a is a merely relay node. Therefore, at the node 2a which receives the compound transaction, the transmission unit 20d transmits the received compound transaction to the other public nodes 2a without any change ((c) of the drawing).

Then, at the node 2a which receives the compound transaction, in a case where the address managed by the own node corresponds to any one of the addresses A and B, and there is left no address by which signature needs to be attached other than the address managed by the own node, the recordation requesting unit 20b writes the signature created by the private key of the address managed by the own node to the transaction. For example, as illustrated in (d) of the drawing, in a case where the address managed by the subject node is "B", the signature "B" is written in the signature column of "the fund movement of 1 dollar from the movement source B to the movement destination A". Then, the recordation requesting unit 20b transmits the compound transaction attached with all of the signatures "A" and "B", and requests to the group of private nodes 2b that the compound transaction is to be recorded to the distributed database 4. The group of private nodes 2b has a recording authority to the distributed database 4, and includes public keys for verifying the signatures "A" and "B" created by the private keys.

FIG. 7 is a functional block diagram illustrating the transaction processing device for the private node 2b. The private node device 21 includes a signature verification unit 22 and a transaction processing unit 23. The signature verification unit 22 verifies the validity of the signature attached to the transaction which is received as the recordation request from the public node 2a. Specifically, in the case of a single transaction, the validity of one signature attached to the transaction is verified using the public key corresponding to the private key. In addition, in the case of a compound transaction, the validities of the plurality of signatures are verified using the public key corresponding to each private key. Further, besides the signature, it is also verified whether the assets are not used in duplicate.

In a case where it is verified that the signature is valid and the other conditions are satisfied, the transaction processing unit 23 records the transaction in the distributed database 4.

The transaction processing unit 23 includes a block generating unit 23a, an approval requesting unit 23b, a block finalizing unit 23c, and an approval responding unit 23d.

Here, a transaction processing device 21 takes two roles. One role is to generate a block by the own node 2b and to request an approval of the block to the other nodes 2b. As the configuration for this role, there are the block generating unit 23a, the approval requesting unit 23b, and the block finalizing unit 23c. Then, the other role is to approve blocks generated by the other nodes 2b. As the configuration for this role, there is the approval responding unit 23d. In this way, the private node 2b can be either a requester to request the approval of the block generated by the own node 2b to the other node 2b, or an approver to perform the approval of the block generated by the other node 2b.

The block generating unit 23a generates a block by collecting a plurality of transactions requested from the public nodes 2a which are the request sources of the transaction recording. In the block generation, the single transaction and the compound transaction are not distinguished, but are handled as equivalent one transaction. The approval requesting unit 23b attaches the signature created by the private key of the own node 2b to the block generated by the block generating unit 23a, and transmits the approval request of the block to the other m (m≥2) private nodes 2b which are set as a system configuration. The own node may be included in the nodes of the request destination of the approval. In a case where an approval result of the block is received from the private node 2b of the request destination of the approval, the block finalizing unit 23c verifies the validity of the signature attached to the approval result using the public key of the request destination of the approval, and determines whether the following block finalizing condition is satisfied.

[Block Finalizing Condition]

Among m (m≥2) private nodes 2b, n (m≥n≥1) or more nodes are approved.

In the block finalizing condition, "n" is preferably a majority of "m". With this configuration, it is possible to secure the reliability of the approval within a reasonable and realistic range. For example, in a case where there are four private nodes 2b illustrated in FIG. 2, approval is requested to three (m=3) private nodes 2b. When the approval is obtained from two (n=2) or more nodes, it is considered that the block finalizing condition is satisfied.

It is preferable that "m" is a limited number such as one digit or two digits, and "m" may preferably be an odd number such as "5" or "9" depending on the block finalizing condition. While "n" is described as a majority of "m", it may preferably be a predetermined number equal to or more than the majority.

As the block finalizing condition, the above explanation has been described such that each node has one ballot for the approval. However, each node may be assigned with an arbitrary positive real number of ballots. The approval may be determined by a majority of the ballots. In this case, the "majority" is a number exceeding the half of the total ballots.

In a case where a block related to the approval request satisfies the block finalizing condition, the addition of the block to the distributed database 4 is finalized, and if not, the addition of the block to the distributed database 4 is not performed. The block finalizing unit 23c notifies the public node 2a which is the request source of the transaction recording of the processing result (OK/NG) of the transaction. In a case where the addition of the block to the distributed database 4 is finalized, the block is added to the database 4a of the ownt node 2b, and all the nodes 2 of the transaction processing network 1 are notified of the fact that a new block is added according to the block finalization. With the notification, the database 4a of all the nodes 2, that is the distributed database 4, is updated.

While it is required that all the nodes 2 are notified directly or indirectly, all the private nodes 2b and some of the public nodes 2a, all the private node 2b, some of the private nodes 2b and some of the public nodes 2a, or some of the private nodes 2b may be notified in addition to the case where all the nodes 2 are notified directly or indirectly of the fact that a new block is added according to the block finalization.

On the other hand, in a case where the approval request of the block is received from the private node 2b which is the request source of the approval, the approval responding unit 23d verifies the validity of the signature attached to the approval request using the public key (corresponding to the private key of the request source of the approval). In addition, the approval responding unit 23d verifies the contents (including the validity of the transactions in the block) of the block of the approval request with reference to data relating to the transaction which is recorded in the own node 2b. Then, in a case where it is verified that the content is valid, the approval responding unit 23d transmits the approval result attached with the signature created by the private key of the own node 2b to the private node 2b of the request source of the approval.

Further, in a case where one block is generated in the own node 2b, as a countermeasure against the hacking of the private node 2b, that is a countermeasure against a case where the private node 2b is hacked, the block generating unit 23a does not continuously transmit the approval request of a new block but is on standby at least until the addition of a block generated by the other node 2b to the distributed database 4 is finalized. In other words, it is prohibited that a process of finalizing a block is continuously performed by the same private node 2b.

Next, a flow of the recording process of the transaction will be described with reference to FIG. 8. First, at a certain public node 2a, a transaction Tr noted with the information on the transaction is generated (step 1). After the signature created by the private key of the address managed by the own node is attached to the transaction Tr, the recordation request of the transaction Tr is transmitted to the group of private nodes 2b (step 2). For example, as illustrated in FIG. 9, in a single transaction Tr2 related the movement source e of the asset, the signature "e" created by the private key of the address managed by the movement source e is attached. In a signal transaction Tr3 of the movement source g of the asset, the signature "g" by the private key of the address managed by the movement source g is attached. In addition, in a compound transaction Tr1 related to the movement sources a and b of the assets, the signatures "a" and "b" created by the private key of the addresses managed by these movement sources are attached through the signature flow illustrated in FIG. 6.

Each of the private nodes 2b which receive the recordation request of the transaction Tr verifies the signature attached to the recordation request using the public key corresponding to the private key of the movement source (step 3). As illustrated in FIG. 9, the signatures "e" and "g" attached to the single transactions Tr2 and Tr3 are verified using the public keys corresponding to the private keys of the movement sources e and g. In addition, the signatures "a" and "b" attached to the compound transaction Tr1 are verified using the public key corresponding to the private keys of the movement sources a and b. Further, besides the signature, it is verified whether the assets are not used in duplicate as described above. In each of the private nodes 2b, in a case where the validity of the signature can be confirmed, the transactions Tr1 to Tr3 are temporally stored in a predetermined storage region (processing standby region) in a storage device of the subject node (step 4). In addition, in step 4, in a case where it is determined that the request source/the movement source of the asset is not valid, the public node 2a which is the request source/the movement source of the assets is informed of the fact.

In step 5, a block is generated by one of the private nodes 2b. The block is made by collecting the plurality of transactions Tr (regardless of single/compound types) which are stored in the processing standby region of the own node 2b. Then, in step 6, an approval request attached with the signature having a data structure as illustrated in FIG. 10(a) is generated. The data structure includes a signature column of the request source which requests the block approval, a block body in which the plurality of transactions Tr are collected, and signature columns of the approval destinations of the block. However, the configuration of the drawing is presented for convenience sake, and the signature columns of the request source/the approval destination are not necessary in reality. In a case where the node A generates a block among four groups of private nodes 2b illustrated in FIG. 2 (node names are A to D), the signature "A" created by the private key of the node A is written in the signature column of the request source of FIG. 10(a), and the signature columns (the columns to be written with the signatures of the nodes B to D) of the approval destinations are made blank. The approval request generated at the node A is transmitted to the other private nodes 2b, that is, three nodes B to D.

Steps 7 to 9 are processes of the private nodes 2b, namely the request destinations B to D of the approval, which receive the approval request of the block. First, in step 7, the validity of the signature attached to the approval request is verified using the public key such as the node A which is the request source of the approval (step 7). In step 7, not only the node A but also the other signatures attached at the time of verification are verified together. Basically, the signatures are made in an order such as nodes A→B→C→D, and the block is finalized when a majority (n) of the signatures are obtained. Many ways of implementation may be considered on how to maintain the order. Further, the verification itself of the signatures of the block is performed not only on the private nodes 2b but also on all the public nodes 2a in order to prevent a hacked block to be believed. In a case where the transaction is determined as valid, the procedure proceeds to step 8. In a case where it is determined as invalid, the processes from step 8 are not performed.

In step 8, the contents of the block related to the approval request is verified. Specifically, in a case where the contents of the block satisfy at least the following approval conditions with reference to the transactions stored in the processing standby region of the own node 2b, the block is approved. In a case where the contents of the block are determined as valid, the procedure proceeds to step 9. In a case where it is determined that the contents are invalid, the process of step 9 is not performed (processing result=NG).

[Approval Condition of Block]

(1) All the transactions Tr in a block are not processed at the own node 2b (preventing double recording).

(2) The contents of all the transactions Tr in a block match with the contents of the transactions Tr stored in the processing standby region of the own node 2b (preventing data falsification).

(3) The assets of each transaction Tr are not used (preventing double use of the assets).

In step 9, the approval result attached with the signature is generated. In a case where the approval is possible, as illustrated in FIG. 10(b), the signature created by the private key of the own node is written in a column assigned to the own node 2b among the signature columns of the approval destinations. The approval result attached with the signature is transmitted to the request source A of the approval.

Steps 10 to 12 are processes of the private node 2b which receives the approval result of the block, namely the request source A of the approval. First, in step 10, the validity of the signature attached to the approval result is verified using the public keys of the request sources B to D of the approval (step 10). In a case where the request destination of the approval is determined as valid, the procedure proceeds to step 11. In a case where it is determined that the request destination is invalid, the processes from step 12 are not performed.

In step 11, in a case where n (m≥n≥1) or more nodes have approved among the m private nodes, the block finalizing condition is satisfied, and it is finalized to add the block to the distributed database 4. In the example of FIG. 10(b), it means that approvals from two nodes B and C among three nodes B to D to which approval was requested are obtained, but an approval from node D is not obtained. In this case, if the block finalizing condition is the approval of the majority or more, n/m=2/3 satisfies the condition. On the contrary, in the case of n=0 or 1, the block finalizing condition is not satisfied.

In a case where the block finalizing condition is satisfied, the finalized block is recorded in the distributed database 4 by the request source A of the approval. Specifically, first, in the own node A, the transaction Tr included in the finalized block is removed from the processing standby region, and the finalized block is added to the database 4 of the own node. In addition, an instruction indicating that the finalized block is newly added is transmitted to the entire transaction processing network 1 including other nodes B to D connected to the subject node A. All the nodes 2 verify the signature of the notification source when the notification of the finalized block is received, and add the finalized block to the database 4a of the own node. In addition, all the nodes 2 (including the nodes B to D) holding an unprocessed transactions Tr in the processing standby region remove the transactions Tr included in the finalized block from the processing standby region with this notification (step 13). In this regard, in a case where the block finalizing condition is not satisfied, the block generated at this time is canceled. In response to this, the unprocessed transactions Tr of the processing standby region are continuously held, and the process waits for a chance to generate the next block.

FIG. 11 is an explanatory diagram of the structure of the database 4a. In this structure, blocks, which is a recordation unit, are linked in a chain shape in a recording order. Each block (finalized block) includes a plurality of transactions and a hash of the previous block. Specifically, a certain block 2 includes a hash H1 of the previous block 1 taken over from the previous block 1. Then, a hash H2 of the block 2 is calculated including a group of transactions of the own block 2 and the hash H1 taken over from the previous block 1. The hash H2 is taken over to the next block. In this way, while the contents of the previous block is taken over as the hash (H0, H1, . . . ), the blocks are linked in a chain shape in a recording order. Therefore, a consistent continuity is given to the recording contents, and thus falsification of the recording contents is effectively prevented. In a case where past recording contents are changed, the hash of the block becomes a value different from that before being changed. In order to make the falsified block appear correct, the hashes of all the subsequent blocks need to be recalculated, and such operation is significantly difficult in fact.

Then, in step 12, the public node 2a which is the recording request source of the transaction Tr is notified of the processing result (OK/NG) of the transaction Tr related to the recordation request from one of the private node 2b (the request source A of the approval). The public node 2a receives the processing result, and presents the processing result to the user (step 14). Through a series of processes above, the recording process of the transaction is ended.

Further, in the recording process of the transaction as described above, the plurality of private nodes 2b may generate individual blocks including the same transaction at the same time, namely the private nodes 2b may compete with each other in processing. Such a problem can be solved by performing exclusive control in which an order of block generation is assigned among the private nodes 2b, for example a round robin. In addition, priorities are assigned to the group of private nodes 2b and in a case where the competition occurs, the reprocessing of the transaction in competition may be allowed only to a higher priority private node 2b.

In this way, according to this embodiment, with respect to compositive transaction in which there are a plurality of movement sources of the assets, it is allowed to be collectively described in a single transaction as a compound transaction. With this configuration, the compositive transaction is simultaneously and integrally recorded in the database 4a (or 4). In a case where the transactions are created as individual transactions in the compositive transaction, there may occur an inconsistency that one transaction is incorporated to a blockchain, but another transaction is not yet incorporated to the blockchain. In this regard, if the two transactions are handled by one transaction as described in this embodiment, such an inconsistency does not occur. As a result, various transaction forms represented by exchange can be handled by a single transaction without causing an inconsistency in the recording situation.

In addition, according to this embodiment, the attaching of the signature by each of the movement sources of the assets in the compound transaction is one of the conditions of validity. Therefore, it is possible to prevent forgery (including a concerned party of a transaction entity), and reliability of the transaction contents noted in the transaction can be secured. In addition, the establishing of the transaction B may be handled on the condition that the transaction A is established. Further, as described above, another condition of the validity of the transaction is that the assets are not used in duplicate.

In addition, according to this embodiment, the nodes 2 of the transaction processing network 1 are classified into the public nodes 2a and the private nodes 2b. The public node 2a takes a role of generating a transaction to be recorded, and the recording process to the distributed database 4 thereafter is performed by cooperation among the group of private nodes 2b. With respect to transaction generation, public nodes 2a which may include unreliable node are widely accepted, but recording process to the distributed database 4 is limited to private nodes 2b which are reliable. In this way, the role of the public nodes 2a and the role of the private nodes 2b are separated, so that the expansibility of applications which is the advantage of the public node scheme and the reliability of recordation which is the advantage of the private node scheme can be both achieved.

In addition, according to this embodiment, as a method of mutual approval among the reliable private nodes 2b, a consensus algorithm which is relatively simple such as the multisignature using public key encryption is used instead of a consensus algorithm which is expensive and slow such as POW and POS. Therefore, it is possible to process a large amount of transactions speedily and securely without damaging the reliability of the recording.

Further, according to this embodiment, it is prohibited that the same private node 2b continuously transmits the approval request of the block in order to prevent that the generation frequency of a block of a specific private node 2b is extremely increased. With this configuration, it is possible to effectively cope with a hacking such as causing a specific private node 2b to always continuously generate blocks to put excessive load.

Further, in the above-described embodiment, the transaction processing system 1 has been described to include the public node 2a and the private node 2b. However, a concept that the transaction form is expanded by introducing a compound transaction is not limited to the above embodiment, but can be applied generally to the blockchain technology such as the public node scheme and the private node scheme. In addition, not only the multisignature using a public key encryption but also any scheme including POW and POS may be employed as the consensus algorithm among the private nodes 2b.

In addition, the invention may be implemented as a computer program which realizes the transaction processing devices 20 and 21 for the public node 2a/the private node 2b.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for requesting recordation of a compound transaction to a blockchain distributed network, the method comprising:
   a first node within the blockchain distributed network signing a compound transaction using a secret key of the first node, wherein the compound transaction includes a data structure in which a plurality of transactions are stored, each transaction having a corresponding source address of one or more assets, wherein the compound transaction includes a first source address with respect to which the first node performs the signing;
   the first node transmitting a first-stage signed compound transaction to a second node within the blockchain distributed network, wherein the first-stage signed compound transaction is the compound transaction as signed by the secret key of the first node and which has at least one other source address with respect to which the transaction is not signed; and
   the first node transmitting a second-stage signed compound transaction to a third node within the blockchain distributed network to request recordation of the second-stage signed compound transaction to the blockchain distributed network, wherein the second-stage signed compound transaction is the compound transaction as signed by the secret key of the first node and which does not have any other source address with respect to which the transaction is not signed;

wherein each respective signature of the compound transaction is made with respect to all of the plurality of transactions stored in the data structure of the compound transaction.

2. The method according to claim 1, wherein the blockchain distributed network has a group of public nodes and a group of private nodes.

3. The method according to claim 2, wherein the first and second nodes are nodes within the group of public nodes.

4. The method according to claim 2, wherein the third node is a node within the group of private nodes.

5. The method according to claim 1, further comprising:
the first node receiving a notice of completion of recordation of the second-stage signed compound transaction to the blockchain distributed network.

6. At least one non-transitory machine-readable medium containing instructions that, when executed by a first node within a blockchain distributed network, cause the first node to perform operations for requesting recordation of a compound transaction to the blockchain distributed network, the operations comprising:
signing a compound transaction using a secret key of the first node, wherein the compound transaction includes a data structure in which a plurality of transactions are stored, each transaction having a corresponding source address of one or more assets, wherein the compound transaction includes a first source address with respect to which the first node performs the signing;
transmitting a first-stage signed compound transaction to a second node within the blockchain distributed network, wherein the first-stage signed compound transaction is the compound transaction as signed by the secret key of the first node and which has at least one other source address with respect to which the transaction is not signed; and
transmitting a second-stage signed compound transaction to a third node within the blockchain distributed network to request recordation of the second-stage signed compound transaction to the blockchain distributed network, wherein the second-stage signed compound transaction is the compound transaction as signed by the secret key of the first node and which does not have any other source address with respect to which the transaction is not signed;
wherein each respective signature of the compound transaction is made with respect to all of the plurality of transactions stored in the data structure of the compound transaction.

7. The at least one non-transitory machine-readable medium according to claim 6, wherein the blockchain distributed network has a group of public nodes and a group of private nodes.

8. The at least one non-transitory machine-readable medium according to claim 7, wherein the first and second nodes are nodes within the group of public nodes.

9. The at least one non-transitory machine-readable medium according to claim 7, wherein the third node is a node within the group of private nodes.

10. The at least one non-transitory machine-readable medium according to claim 6, further comprising:
the first node receiving a notice of completion of recordation of the second-stage signed compound transaction to the blockchain distributed network.

11. A node operative within a blockchain distributed network, the node comprising:
computing circuitry; and
a data store;
wherein the computing circuitry is operative to:
sign a compound transaction using a secret key of the node, wherein the compound transaction includes a data structure in which a plurality of transactions are stored, each transaction having a corresponding source address of one or more assets, wherein the compound transaction includes a first source address with respect to which the node performs the signing;
transmit a first-stage signed compound transaction to a second node within the blockchain distributed network, wherein the first-stage signed compound transaction is the compound transaction as signed by the secret key of the first node and which has at least one other source address with respect to which the transaction is not signed; and
transmit a second-stage signed compound transaction to a third node within the blockchain distributed network to request recordation of the second-stage signed compound transaction to the blockchain distributed network, wherein the second-stage signed compound transaction is the compound transaction as signed by the secret key of the node and which does not have any other source address with respect to which the transaction is not signed;
wherein each respective signature of the compound transaction is made with respect to all of the plurality of transactions stored in the data structure of the compound transaction.

12. The node according to claim 11, wherein the blockchain distributed network has a group of public nodes and a group of private nodes, and wherein the node and the second node are each nodes within the group of public nodes.

13. The node according to claim 12, wherein the blockchain distributed network has a group of public nodes and a group of private nodes, and wherein the third node is a node within the group of private nodes.

14. The method according to claim 11, wherein the computing circuitry is further operative to: receive a notice of completion of recordation of the second-stage signed compound transaction to the blockchain distributed network.

* * * * *